United States Patent [19]

Allen

[11] Patent Number: 4,846,769
[45] Date of Patent: Jul. 11, 1989

[54] MECHANICAL FUSE FOR RECIPROCATING ROLLER CHAIN

[75] Inventor: John T. Allen, Duncan, Okla.
[73] Assignee: Halliburton Company, Duncan, Okla.
[21] Appl. No.: 154,737
[22] Filed: Feb. 10, 1988
[51] Int. Cl.[4] ............................................. F16G 15/00
[52] U.S. Cl. ........................................ 474/218; 403/2
[58] Field of Search .................. 474/218–225; 403/2, 157, 79; 24/588

[56] References Cited

U.S. PATENT DOCUMENTS

| | | | |
|---|---|---|---|
| 1,568,992 | 1/1926 | Mudge | 474/218 |
| 3,082,684 | 3/1963 | Sturla | 100/142 |
| 3,847,031 | 11/1974 | Araya | 474/218 X |
| 3,922,104 | 11/1975 | McCullough | 403/2 |
| 3,939,721 | 2/1976 | Kuenzig et al. | 474/218 |
| 3,944,023 | 3/1976 | Fisher | 182/48 |
| 4,035,092 | 7/1977 | Adams, Jr. | 403/2 |
| 4,716,635 | 1/1988 | Flocchini | 24/588 |

FOREIGN PATENT DOCUMENTS 0137690  10/1979  Japan ................................. 403/2

Primary Examiner—Thuy M. Bui
Attorney, Agent, or Firm—Mark E. McBurney

[57] ABSTRACT

A mechanical fuse for a reciprocating roller chain is provided which protects mechanical apparatus, such as a carriage assembly, from damage due to a mechanical power surge, or overload. A stirrup shaped body portion is included with a protruding member and a receiving member disposed thereon. The protruding member connects with a master link in the roller chain and the receiving member is connectable via a shear pin to either an end link in the roller chain, or the mechanical apparatus being protected. The shear pin is placed perpendicularly to the direction of the potential mechanical power surge and shears upon application of a tangential force which is greater than can be withstood by the shear pin, but less than the amount of force which will damage the mechanical apparatus, or any other drive components. Therefore, the shear pin separates and interrupts the roller chain path, relieving any mechanical overload, prior to any damage being sustained by the mechanical apparatus or roller chain.

15 Claims, 2 Drawing Sheets

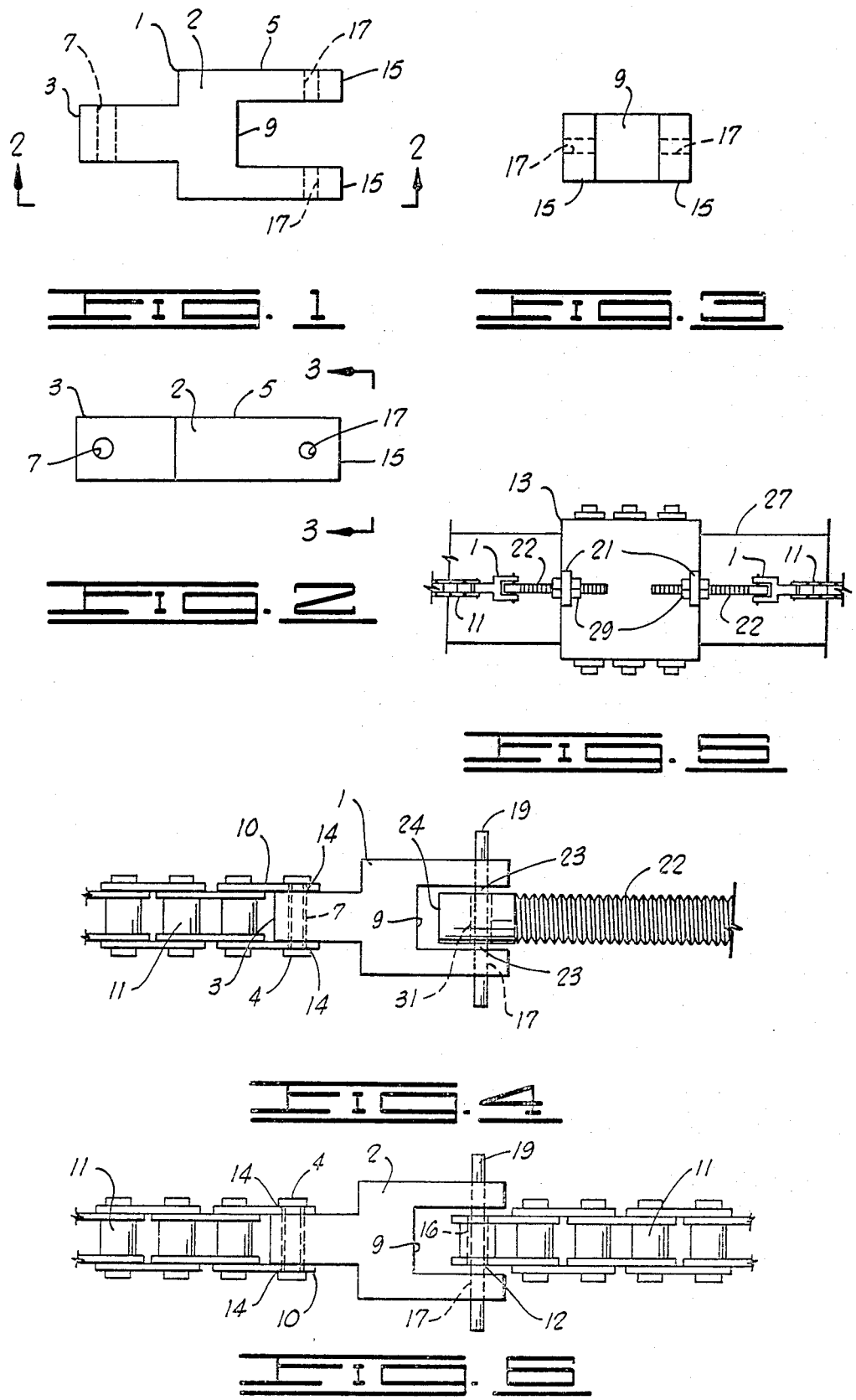

MECHANICAL FUSE FOR RECIPROCATING ROLLER CHAIN

BACKGROUND OF THE INVENTION

Reciprocating roller chain drive systems have many applications and have been used on numerous mechanical systems. Briefly, a sprocket transfers driving force from a motor, or other source of power to a roller chain which transfers the driving force to a mechanical apparatus such as a carriage, trolley, shaft, wheel, gear box, or the like, which is to be driven.

For example, a carriage assembly may be series connected into the roller chain path, wherein the driving force is used to move the carriage assembly along a track, or to follow the path of the reciprocating roller chain. In this case, the second sprocket (idler or driven sprocket) is used to complete the roller chain path and may transfer the driving force to a mechanical apparatus. As can readily be seen, numerous manufacturing, production and operating applications may use a reciprocating roller chain, for example, to move components from one point to another for assembly or to provide reciprocating rotational power to a shaft, a gear box, or the like.

Providing a protection device in the roller chain path is highly desired, particularly when the roller chain is tensionally stronger than the carriage assembly or mechanical equipment which is to be driven by the reciprocating roller chain. This is particularly true when the carriage assembly or mechanical equipment is more expensive than a roller chain, and the time required for replacement would be much greater than replacing or reinstalling a roller chain.

A protection device is desirable which will open the driving path of the roller chain and will prevent excessive force from being applied to the carriage assembly or mechanical equipment when the driving force exceeds the strength which can be withstood by the carriage assembly, or mechanical equipment, but is less than the tensional strength of the roller chain. Thus, by opening the driving path of the roller chain, possible damage to the carriage assembly or mechanical equipment is prevented.

A tension link control device is disclosed by U.S. Pat. No. 3,922,104 to McCullough, which includes an inner and outer cylinder with a fracture link therebetween. This fracture link will separate as tensional force is applied. Further, the fracture link is specially configured with threaded ends and is held within a semi-circular bored member using the threaded ends and set screws. The McCullough tension link control device contains several drawbacks, among them is the large number of steps required to assemble the tension link control device both initially, and to replace the fracture link once separation occurs. Moreover, a high degree of precision is required to manufacture the McCullough link control device. The fracture link is made with chemically analyzed steel and must be calibrated to achieve a high order of surface smoothness. The fracture link is held in place using threads which must have a special thread pitch with a considerable amount of axial play (this play must be on the order of approximately 0.07 inches). Further, the actual thread play must be computed for each application of the tension link control device as based upon thread profile, thread pitch, material shear strength and design of fracture loads.

In view of the foregoing disadvantages and drawbacks due in part to the high degree of precision required to manufacture and install the tension link control device, a mechanical protection device (mechanical fuse), such as the present invention, which will protect more expensive components of a mechanical system used with a reciprocating roller chain is highly desirable. The present invention provides a mechanical fuse which is less complicated, more easily installed and easier to manufacture and replace when compared with the prior art.

SUMMARY OF THE INVENTION

The present invention, in contrast with the prior art, provides a mechanical protection device (mechanical fuse) which can be used to protect expensive mechanical equipment by disengaging the equipment from the mechanical driving force, upon receipt of a mechanical power surge or overload. Further, the present invention has been incorporated into an apparatus which is the subject of a co-pending application titled "Air Preheater Water Jet Cleaning Apparatus", U.S. Ser. No. 154,736, Filed on Feb. 10, 1988 by the present inventor, and assigned to the assignee of the present invention.

The mechanical fuse device shears upon application of a tangential mechanical force which is greater than a predetermined level. A mechanical fuse is sized such that the mechanical force required to shear the device is less than the amount of mechanical force which the equipment that is to be protected can withstand without sustaining damage.

The mechanical fuse of the present invention includes a body portion, which is of a substantially stirrup shape. A first connecting member is provided for engaging the mechanical fuse with the mechanical equipment to be protected. Further, a second connecting member is utilized for engaging the mechanical fuse with a member, which is used to mechanically drive the equipment. Next, a shearing device is used to effect the connection between the first connecting member and the equipment, such that upon application of a mechanical power surge, the shearing device separates and the equipment is disengaged from the mechanical driving member. Thus, the shearing device is sacrificed to protect a more expensive piece of equipment.

In accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 1 is a top plan view showing a mechanical fuse of the present invention;

FIG. 2 is a side elevational view, taken along line 2—2 of FIG. 1, illustrating engaging holes of the mechanical fuse;

FIG. 3 is a front side elevational view, taken along line 3—3 of FIG. 2, of the mechanical fuse of the present invention;

FIG. 4 is a schematic diagram showing the interconnection of the mechanical fuse with a roller chain;

FIG. 5 is a schematic diagram illustrating a preferred embodiment of the present invention which shows the interconnection of the mechanical fuse with equipment being protected and a roller chain;

FIG. 6 is a schematic diagram showing another embodiment of the present invention, wherein the mechanical fuse is interconnected within a roller chain.

DETAILED DESCRIPTION OF THE PREFERRED EMBODIMENTS

Figure 7:
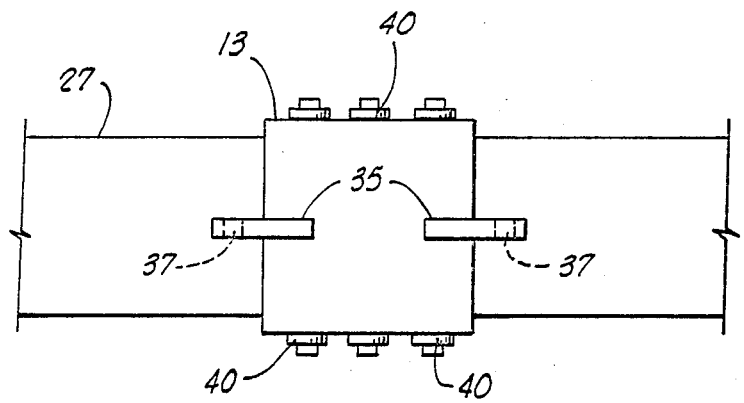
FIG. 7 is a plan view illustrating a means of connecting the mechanical fuse to an equipment carriage.

Referring to FIG. 1, a top plan view of the mechanical fuse 1 of the present invention is shown wherein reference numeral 2 represents a substantially stirrup shaped solid body portion, including protruding member 3 and receiving member 5.

Protruding member 3 allows engagement between the mechanical fuse 1 and a mechanical drive member, such as a roller chain 11 (FIG. 4), or the like. A cylindrically shaped connecting hole 7 allows a connector 4 (FIG. 4), such as a pin, link, threaded bolt or other means to pass through a master link 10 included in roller chain 11 such that a mechanical connection can be effected. Receiving member 5 includes a rectangular hollowed out area 9 which is sized to allow an end portion 24 of equipment engaging means (FIG. 4) or an end link 12 (FIG. 6) to be inserted, as described below.

At least two prong members 15 are disposed on receiving member 5, the prong members 15 define rectangular area 9. As previously stated, engaging means can be inserted into rectangular area 9, i.e. between prong members 15. Prong members 15 each have at least one cylindrically shaped hole 17 therethrough which are axially aligned with each other and in parallel relationship to connecting hole 7. Pin holes 17 may be of a smaller diameter than connecting hole 7 and sized such that a shear pin 19 (FIG. 4) is insertable therethrough.

FIG. 2 illustrates a side elevational view taken along line 2—2 of FIG. 1. FIG. 2 shows connecting hole 7 for effecting connection with master link 10 of roller chain 11, and pin hole 17 in which shear pin 19 is inserted, wherein a mechanical connection is effected with equipment 13 to be protected as described below.

FIG. 3 is an end elevational view taken along line 3—3 of FIG. 2 of receiving member 5, which outlines rectangular area 9. Additionally, the axial alignment of pin holes 17 is shown and the means of inserting shear pin 19 into pin holes 17 can be readily understood by one skilled in the art.

FIG. 4, illustrating a preferred embodiment of the present invention, shows the actual connection of mechanical fuse 1 to roller chain 11 and to the equipment 13 engaging means. Particularly, protruding member 3 is inserted into master link 10 of roller chain 11 and connector 4 is inserted therethrough. Master link 10 allows roller chain 11 to be opened and protruding member 3 is sized such that insertion into master link 10 is accomplished. Cylindrically shaped holes 14, contained in master link 10, allow connector 4 to be inserted therethrough once connecting hole 7 and master link holes 14 are axially aligned.

As previously noted, prongs 15 define a rectangular area 9 which is sized such that equipment 13 engaging means can be inserted therein. The equipment 13 engaging means may include a threaded rod 22, equipment attachment bracket 21 (FIG. 5), an end portion 24 and threaded nuts 29.

Equipment attachment bracket 21 is rigidly affixed to equipment 13 and threaded nuts 29, with thread dimensions corresponding to the threads on rod 22, are screwed onto threaded rod 22. Therefore, the length of threaded rod 22 that extends from equipment 13 can be adjusted and thus the tension of roller chain 11 is also adjustable.

End portion 24 is disposed on the end of threaded rod 22 opposite to attachment bracket 21. A cylindrically configured engaging pin hole 31 is disposed therethrough. To effect mechanical connection between equipment 13 and mechanical fuse 1, via the equipment 13 engaging means, end portion 24 is inserted between prongs 15. Next, engaging pin hole 31 and pin holes 7 are axially aligned such that shear pin 19 is insertable therethrough. Reference numerals 23 indicate the points at which actual shearing, or separation of shear pin 19 will occur, upon application of a mechanical power surge or overload which is greater than the tangential strength which can be withstood by shear pin 19.

Additionally, a clip 35 (FIG. 7) including a cylindrically configured hole 37 therethrough may be welded to equipment 13 such that connection may be made between mechanical fuse 1 and equipment 13 by inserting shear pin 19 into pin holes 17 and the cylindrically configured hole 37 in the clip 35.

FIG. 5 is a schematic diagram illustrating a preferred embodiment of the use of mechanical fuse 1. Equipment 13, in this case a carriage (but may include a trolley, or the like) including rollers 40, is moved along a track 27 by an outside power source such as an electric motor, a pneumatic motor, or the like (not shown) which drives roller chain 11.

Should a mechanical power surge occur, or if the movement of equipment 13 is impeded causing increased tensional force to be applied to equipment 13 by roller chain 11, shear pin 19 of mechanical fuse 1 will shear and roller chain 11 will open, thus relieving the potentially destructive mechanical force applied to equipment 13.

Referring to FIG. 6 another preferred embodiment of the present invention is illustrated. As previously discussed, roller chain 11 is connected to protruding member 3 via master link 10 and connector 4.

Roller chain 11 also includes an end link 12 which is normally inserted into master link 10 and connected via connector 4. In this embodiment, end link 12 is inserted into rectangular area 9. End link 12 includes cylindrically configured end link hole 16 which allows mechanical connection between roller chain 11 and mechanical fuse 1 to be effected upon insertion of shear pin 19 after pin holes 17 and end link hole 16 are axially aligned. By insertion into pin hole 17 and end link hole 16, shear pin 19 effects a mechanical connection between equipment 13 and mechanical fuse 1 via end link 12 and roller chain 11 which is connect to the equipment 13.

As can readily be seen, mechanical fuse 1 is connected in series with roller chain 11 and roller chain 11 is then connectable to equipment 13, using one of several methods known in the art. As tension in roller chain 11 increases beyond a predetermined level, shear pin 19 tangentially separates thus interrupting the continuity of roller chain 11. Therefore, roller chain 11 and any equipment connected thereto are protected from damage which could be inflicted due to a mechanical power surge, or overload.

Shear pin 19 is of a size and strength such that shear pin 19 is the weakest member in a drive train which includes equipment 13, threaded rod 22, roller chain 11, mechanical fuse body portion 2 and a mechanical drive source (not shown). Therefore, if a mechanical power surge is applied, shear pin 19, which is placed perpendicularly to the direction of the mechanical power surge, will shear and the mechanical power surge will not damage equipment 13 or roller chain 11.

Replacement of shear pin 19 can be readily accomplished by aligning receiving member 5 with end portion 24 or end link 12 and inserting a new shear pin 19 therethrough. Due to the size of shear pin 19, a supply can be easily kept at a job site or with the equipment 13.

Mechanical fuse body portion 2 will be constructed of a hard durable material such as steel, ceramic, or the like which has superior tensile strength characteristics. Shear pin 19 is commonly available and generally fabricated from a high grade steel. Due to the fact that mechanical fuse body portion 2 is of a much greater area than shear pin 19 and since the shear strength of metals is 50% to 60% of tensile or compressive strength, shear pin 19 may be made from a material which is much stronger than mechanical fuse body portion 2. Therefore, shear pin 19 will be susceptible to tangential force and reach the point of ultimate failure prior to mechanical fuse body portion 2 beginning any localized yielding. To preset at what level of tangential force shear pin 19 will separate is accomplished by utilizing shear pins 19 with differing diameters and which are constructed of different materials. As previously noted, the predetermined level of tangential force at which shear pin 19 will separate will be less than the mechanical power surge which can be withstood by equipment 13 and roller chain 11.

Due to the relatively uncomplicated configuration of shear pin 19 and mechanical fuse body portion 2, construction of mechanical fuse 1, of the present invention, can be readily accomplished using standard manufacturing techniques as are known in the art.

Although certain preferred embodiments have been shown and described, it should be understood that many changes and modifications may be made therein without departing from the scope of the appended claims.

What is claimed is:

1. A mechanical protection device, comprising:
  a substantially stirrup shaped body portion, including
    a receiving member having at least two prongs, each with a cylindrical pin hole therethrough, said pin holes being axially aligned; and
    a protruding member including at least one cylindrical connecting hole therethrough, said connecting hole being in parallel relation to said pin holes;
  a roller chain connectable to said protruding member;
  an equipment carriage, reciprocatingly movable along a stationary track, said carriage including rollers in communication with said track for reducing the friction therebetween;
  carriage engaging means for effecting a mechanical connection between said carriage and said body portion; and
  shear means for disengaging the connection between said carriage and said body portion upon application of a mechanical power surge greater than a determined level.

2. An apparatus according to claim 1, wherein said carriage engaging means includes means for adjusting the tension of said roller chain.

3. An apparatus according to claim 2, wherein said carriage engaging means comprises a threaded rod attached on one end to said carriage by at least one corresponding threaded nut and the other end of said threaded rod including an end portion with a cylindrically configured hole therethrough.

4. An apparatus according to claim 3, wherein said carriage engaging means comprises a clip which is welded to said carriage, said clip including a cylindrically configured hole therethrough.

5. An apparatus according to claim 2, wherein, said adjusting means comprises a threaded rod attached on one end to said carriage by at least one corresponding threaded nut and the other end of said threaded rod includes an end portion with a cylindrically configured hole therethrough.

6. An apparatus according to claim 1, wherein said shear means comprises at least one shear pin which is slidably inserted into said pin holes and said carriage engaging means and shears upon application of said mechanical power surge.

7. An apparatus according to claim 6, wherein said body portion is connected in a series relationship with said carriage and said roller chain.

8. An apparatus according to claim 1, wherein said body portion and said shear means are series connected within said roller chain.

9. An apparatus according to claim 1, wherein the shearing force which can be withstood by said shear pin is less than the force which can be withstood by said roller chain and said equipment carriage.

10. An apparatus according to claim 9, wherein said shear pin breaks at two points upon application of said mechanical power surge.

11. A mechanical protection device, comprising:
  an equipment carriage, reciprocatingly movable along a stationary track;
  drive means for providing a first mechanical force to move said carriage;
  protection means for disengaging said drive means from said carriage upon application of a mechanical force to said carriage greater than said first mechanical force; and
  engaging means for mechanically engaging said protection means with said carriage.

12. An apparatus according to claim 11 wherein said drive means includes a roller chain.

13. An apparatus according to claim 12 wherein said protection means includes:
  a stirrup shaped body member having a protruding portion with a cylindrical connecting hole therethrough, said body member having a receiving portion including at least two prongs each having a cylindrical pin hole therethrough, said pin holes being axially aligned and in parallel relation with said connecting hole; and
  a shear pin, slidably insertable into said pin holes, for linking said protection means with said carriage, said pin shearing upon application of a mechanical force greater than said first mechanical force.

14. An apparatus according to claim 12 wherein said engaging means includes means for adjusting the tension of said roller chain.

15. An apparatus according to claim 14 wherein said adjusting means comprises a threaded rod attached on one end to said carriage by at least one corresponding threaded nut and the other end of said threaded rod including and end portion with a cylindrically configured hole therethrough.

* * * * *